(12) United States Patent
Doyle

(10) Patent No.: US 8,656,430 B2
(45) Date of Patent: Feb. 18, 2014

(54) PROCESSING SYSTEM WITH ELECTRONIC PROGRAM GUIDE AUTHORING AND METHODS FOR USE THEREWITH

(75) Inventor: James Doyle, Toronto (CA)

(73) Assignee: ViXS Systems, Inc., Toronto, Ontario (CA)

( * ) Notice: Subject to any disclaimer, the term of this patent is extended or adjusted under 35 U.S.C. 154(b) by 0 days.

(21) Appl. No.: 13/183,251

(22) Filed: Jul. 14, 2011

(65) Prior Publication Data

US 2013/0019266 A1    Jan. 17, 2013

(51) Int. Cl.
*G06F 3/00* (2006.01)
*G06F 13/00* (2006.01)
*H04N 5/445* (2011.01)

(52) U.S. Cl.
USPC ............................................. 725/47; 725/44

(58) Field of Classification Search
None
See application file for complete search history.

(56) References Cited

U.S. PATENT DOCUMENTS

| | | | | |
|---|---|---|---|---|
| 6,081,263 A | * | 6/2000 | LeGall et al. | 715/760 |
| 6,177,931 B1 | * | 1/2001 | Alexander et al. | 725/52 |
| 7,304,685 B2 | * | 12/2007 | Park et al. | 348/556 |
| 2005/0155063 A1 | * | 7/2005 | Bayrakeri et al. | 725/47 |
| 2005/0251827 A1 | * | 11/2005 | Ellis et al. | 725/47 |

* cited by examiner

*Primary Examiner* — Oschta Montoya
(74) *Attorney, Agent, or Firm* — Garlick & Markison; Bruce E. Stuckman

(57) ABSTRACT

A processing system includes a memory module that stores an electronic program guide (EPG) authoring application. A processing module executes the EPG authoring application including a graphical user interface that responds to input from an end user. The EPG authoring application creates EPG configuration data to configure an EPG application of a client device associated with the end user.

10 Claims, 14 Drawing Sheets

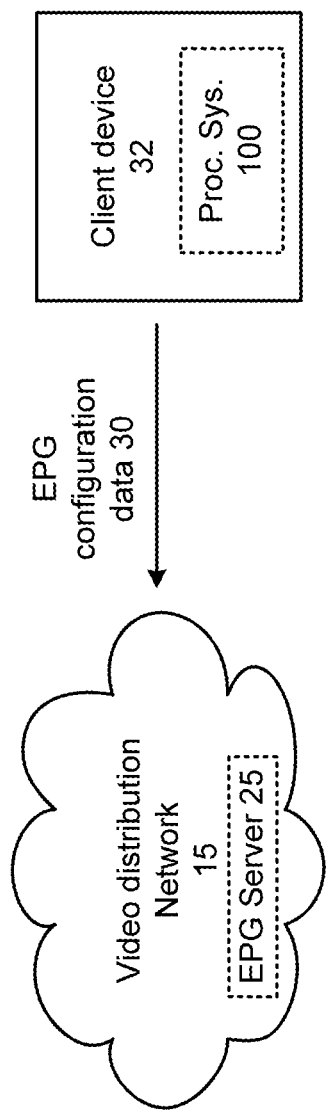
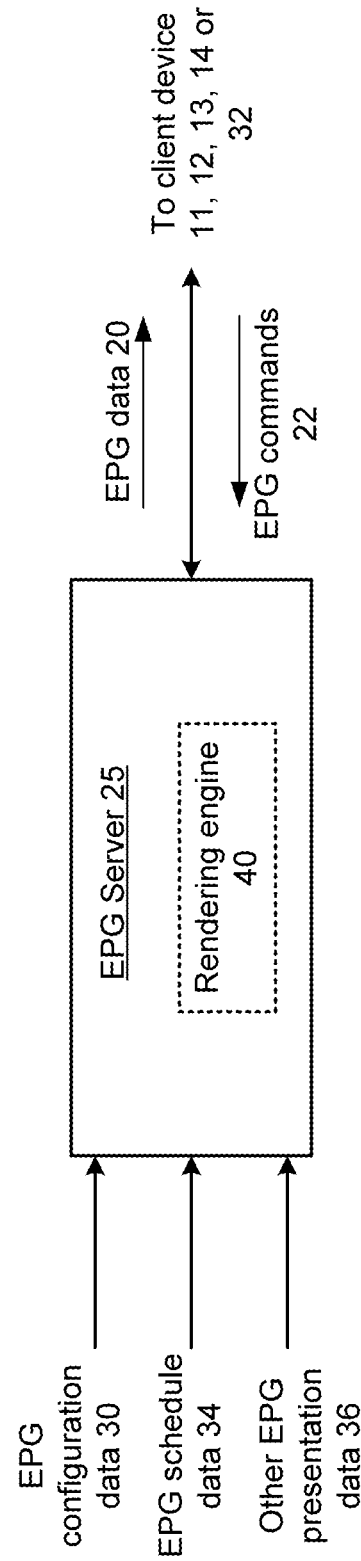

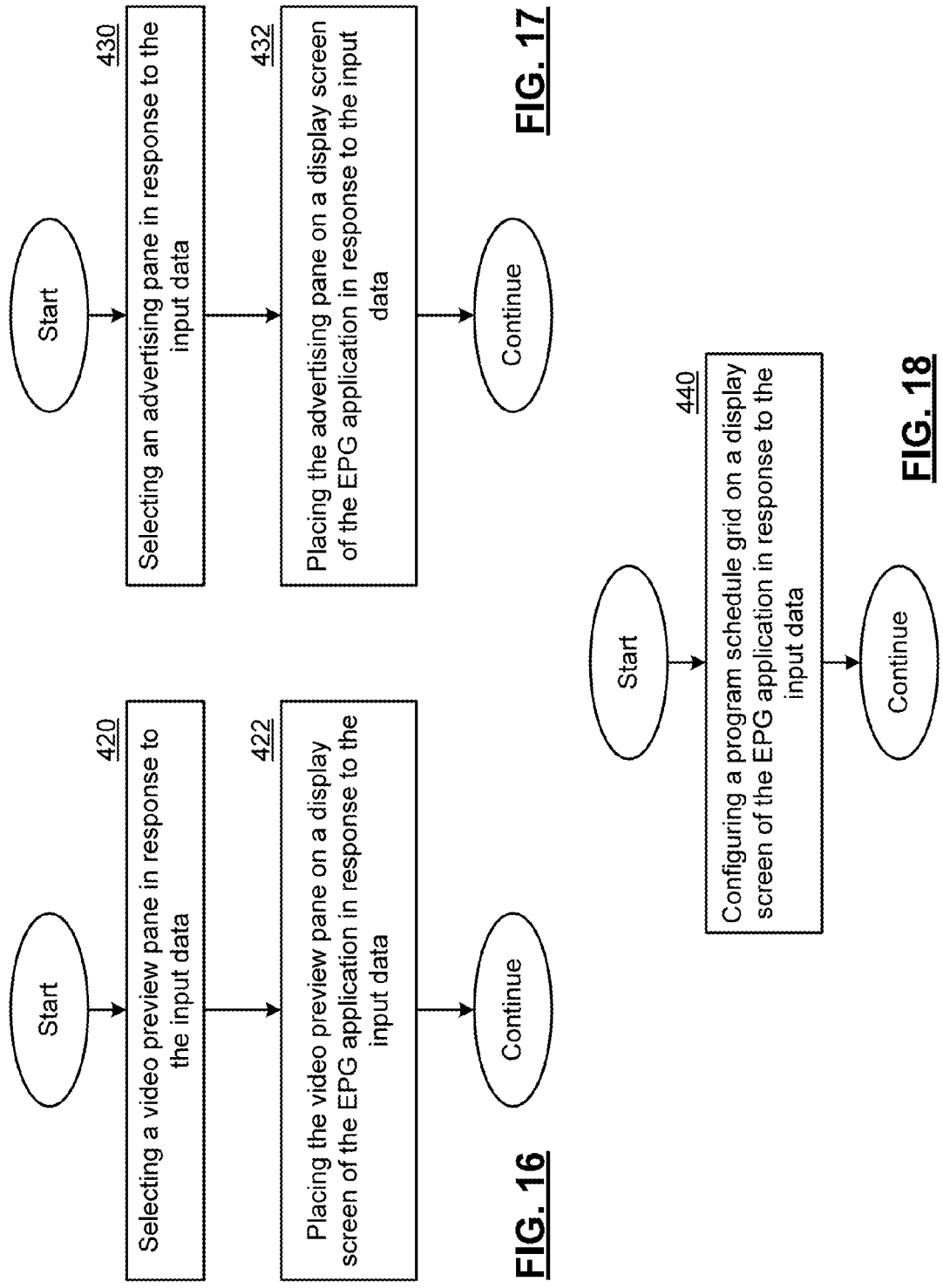

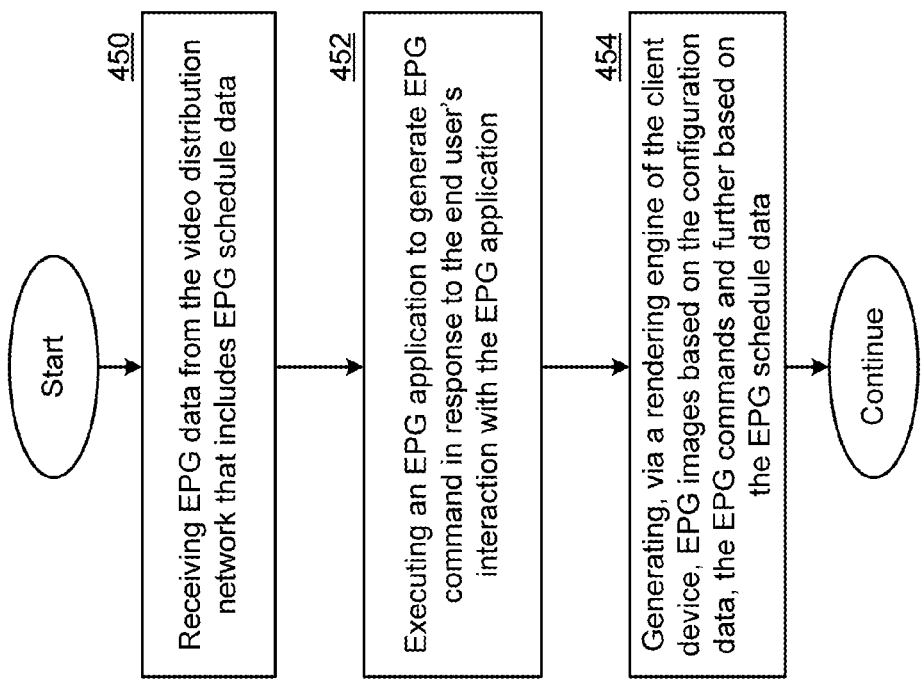

PROCESSING SYSTEM WITH ELECTRONIC PROGRAM GUIDE AUTHORING AND METHODS FOR USE THEREWITH

CROSS REFERENCE TO RELATED PATENTS

Not applicable

TECHNICAL FIELD OF THE INVENTION

The present invention relates to electronic program guides used in conjunction with video display devices.

DESCRIPTION OF RELATED ART

Electronic program guides (EPGs) are commonly used in devices, such as cable set top boxes to display video broadcast schedules. EPG data received from the video service provider is stored in the set top box. When a user wishes to view what is playing or what will be playing at some time in the near future, the user can access the electronic program guide. Electronic guides typically allow a user to browse program schedule data by time and or channel. The schedule data typically includes program titles and optionally additional information such as Motion Picture Association of America ratings, program descriptions, program reviews and optionally other data.

One form of cable set top box is the digital video recorder DVR. In addition to conventional set top box functionality, a DVR includes a hard drive or other storage medium for storing broadcast programming for later playback. In addition to the time shifting associated with program storage and playback, DVRs typically include the ability to pause, fast forward and rewind recorded programs, to provide the user a similar experience to digital video disc (DVD) playback. Electronic program guides that are implemented in a DVR can include the ability to view upcoming broadcast programs and interactively select programs for recording and storage.

EPGs are developed by the manufacturer of the set top box and stored in the memory of the set top box. Updating the EPG generally requires either a software download to the set top box from the video server provider or a replacement of the set top box.

The limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 2 presents a block diagram representation of a client device 32 in accordance with an embodiment of the present invention.

FIG. 3 presents a block diagram representation of an EPG server 25 in accordance with an embodiment of the present invention.

FIG. 16 presents a flowchart representation of a method in accordance with an embodiment of the present invention.

FIG. 17 presents a flowchart representation of a method in accordance with an embodiment of the present invention.

FIG. 18 presents a flowchart representation of a method in accordance with an embodiment of the present invention.

FIG. 19 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
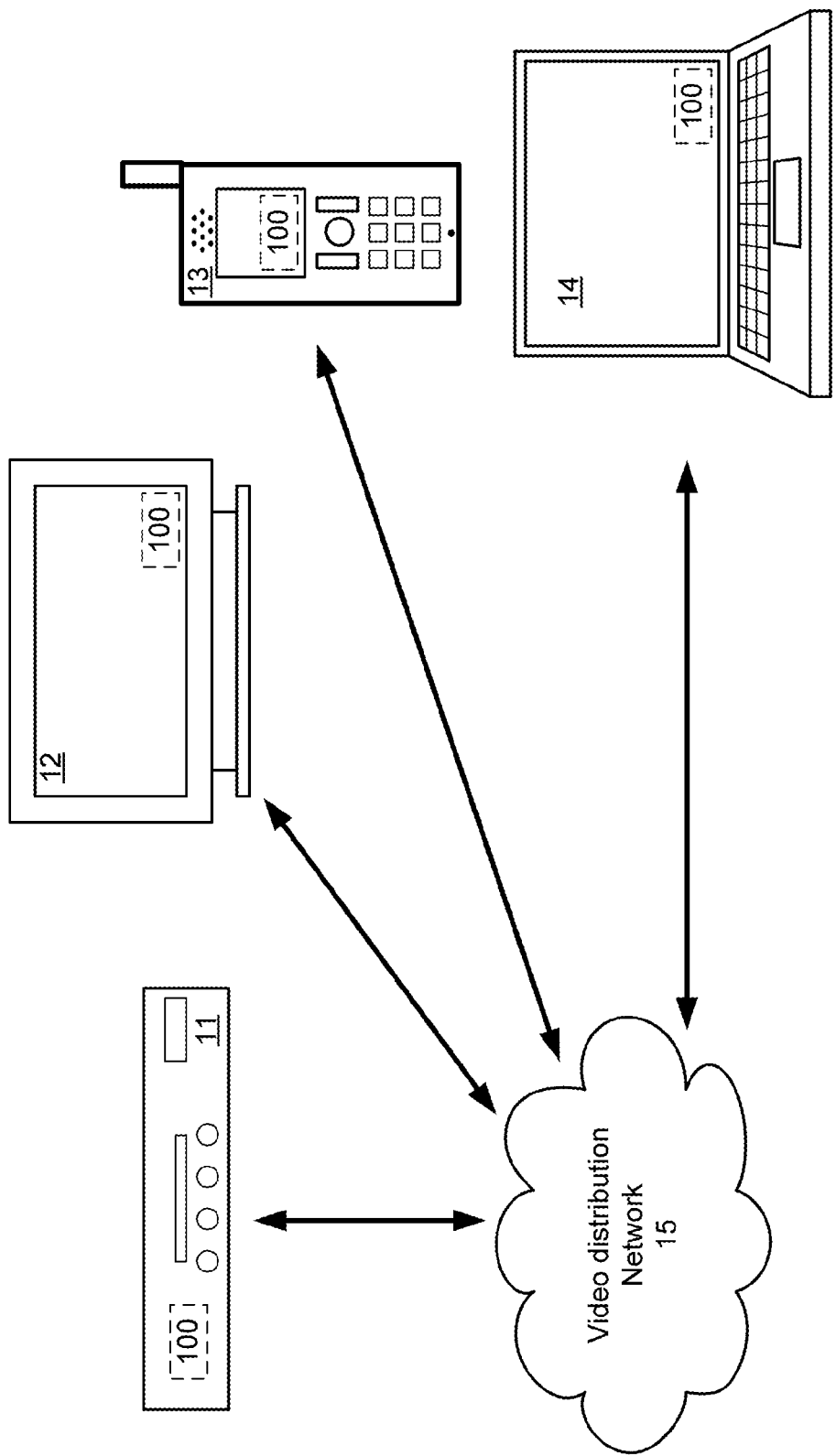
FIG. 1 presents a pictorial representation of example devices 11-14 that can include a processing system 100 in accordance with an embodiment of the present invention.

FIG. 1 presents a pictorial representation of example devices 11-14 that can include a processing system 100 in accordance with an embodiment of the present invention. In particular, these example devices include digital video recorder/set top box 11, television or monitor 12, wireless telephony device 13, and computers 14 and/or other devices that include a processing system 100 and that access video content provided by video distribution network 15. Video distribution network 15 can include a broadcast television network, a broadcast satellite system, internet protocol (IP) TV system, a mobile video distribution system, the Internet, a video on demand system or other transmission network.

In particular, processing system 100 includes a memory module that stores an electronic program guide (EPG) authoring application. A processing module executes the EPG authoring application including a graphical user interface that responds to input from an end user. The EPG authoring application creates EPG configuration data to configure an EPG application of a client device 11, 12, 13 or 14 associated with the end user.

In an embodiment of the present invention, the processing module 100 generates EPG configuration data to configure the EPG application of the same client device that contains the processing system 100. In the alternative, a particular client device, such as client device 14 can be used to create EPG configuration data to configure an EPG application of a different client device 11, 12 or 13 associated with the end user. In either case, a customized EPG experience is created for one or more of the end user's devices.

Processing system 100 will be described in greater detail in conjunction with FIGS. 2-19, including several optional functions and features.

FIG. 2 presents a block diagram representation of a client device 32 in accordance with an embodiment of the present invention. In particular, a client device 32 is shown, such as client device 11-14 or other client device. Client device 32 includes processing module 100 that executes an EPG authoring application that generates EPG configuration data 30. The EPG configuration data is provided to EPG server 25 of the video distribution network 15.

As discussed in conjunction with FIG. 1, client device 32 can be a personal computer, such as computer 14, that executes the EPG authoring application in order to generate EPG configuration data 30 for either itself or for another client device associated with the user, such as client devices 11-13. The EPG authoring application includes a graphical user interface that allows the user to set up and customize the EPG based on the screen configuration and layout of the particular client device 11-14 to be running the EPG application and further based on the tastes and preferences of the user.

In an embodiment of the present invention, the client device 32 includes a network card or modem and sends the EPG configuration data 30 to the EPG server 25 via a public wide area network such as the Internet. In the alternative, the video distribution network 15, such as a cable network or mobile television network, includes a return path for providing upstream data from client devices coupled to the video distribution network 15 and the EPG configuration data 30 is provided to the EPG server 25 via this return path.

Further details regarding the EPG server 25 are presented in conjunction with FIG. 3.

FIG. 3 presents a block diagram representation of an EPG server 25 in accordance with an embodiment of the present invention. In particular, EPG server 25 includes a rendering engine 40. In operation, the EPG server 25 receives and stores EPG configuration data 30 that is associated with a particular client device 11-14 or 32. The EPG server 25 further receives and stores EPG schedule data 34 that includes program titles and optionally additional information such as Motion Picture Association of America ratings, program descriptions, program reviews and optionally other data that describes a plurality of video programs that are either available on a broadcast basis at particular times and on particular channels and/or other video programming that can be selected and streamed, downloaded or otherwise provided to the client device. In addition, the EPG server 25 optionally receives and buffers or stores other EPG presentation data such as live video feeds, channel feeds, program trailers, video commentary, supplemental program information, advertising data or other data to be provided in conjunction with an EPG.

In operation, the EPG server 25 responds to EPG commands 22 received from a plurality of client devices 11-14 and/or 32 and sends EPG data 20 in response in order to facilitate the provision of an EPG at each of the client devices 11-14 and/or 32 that is customized for that client device.

In an embodiment of the present invention, the rendering engine 40 of EPG server 25 responds to EPG commands 22 from client devices 11-14 and/or 32 to generates EPG data 20 in the form of compressed image data, based on the EPG configuration data 30 for that device, the current EPG schedule data 34 and other EPG presentation data 36. A client device 11-14 or 32 executes an EPG application that receives the EPG data 20 that is addressed to that device and displays the EPG data 20 on a display screen. In particular, the EPG application provides an interactive graphical user interface that allows the end user of the client device to issue further EPG commands 22 to browse the program schedule data 34 and review other EPG presentation data 36 in order to select a program to view, a program to download or record, etc. In an embodiment, the client device 11-14 and/or 32 implements the EPG application as a browser application and the EPG server 25 generates data 20 to include hypertext markup language (HTML) data as well as image data and optionally video data.

The EPG server 25 can be implemented via a commercial server or other computing device that includes a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Note that when such a processor implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 4:
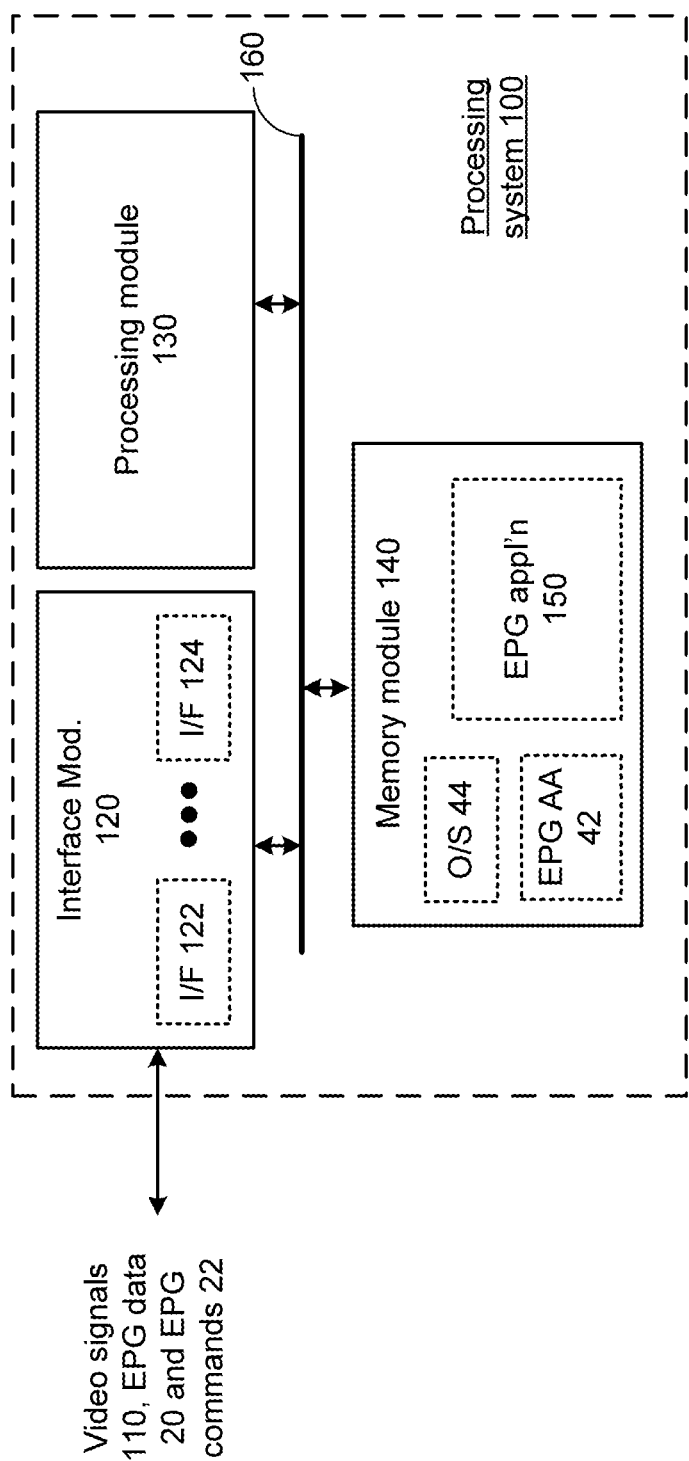
FIG. 4 presents a block diagram representation of a processing system 100 in accordance with an embodiment of the present invention.

FIG. 4 presents a block diagram representation of a processing system 100 in accordance with an embodiment of the present invention. In particular, processing system 100 includes interface module 120, processing module 130, memory module 140, and bus 160. While a particular bus architecture is shown, alternative architectures using direct connectivity between one or more modules and/or additional buses can likewise be implemented in accordance with the present invention. Further, processing system 100 can include one or more additional modules that are not specifically shown that provide further functionality of client device 11-14 or 32 such as one or more user interface devices, a display screen, etc.

The memory module 140 stores an electronic program guide (EPG) authoring application 42 that, when executed by processing module 130, generates EPG configuration data 30. In addition, the EPG authoring application 42 stores an EPG application 150 that, when executed by processing module 130, generates EPG commands 22 and receives EPG data 20 in response in order to present an interactive EPG to the end user of the client device that hosts the processing system 100. Memory module 140 optionally stores an operating system 140 such as a Linux, Mac OS, MS Windows, Solaris, a mobile operating system or other operating system and one or more other applications, such as a video player application or other application to be executed by processing system 100. While not specifically shown, the memory module 130 can store program files and other data files, system data, buffers, drivers, utilities and other system programs, and other data. Memory module 140 can include a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information.

The processing module 130 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 140. Note that when the processing module 130 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. As discussed above, the processing module executes the EPG authoring application 150 that provides a graphical user interface that responds to input from an end user and that creates EPG configuration data 30 to configure the EPG application 150 of a client device associated with the end user.

Interface module 120 includes one or more interfaces to other devices that are either included or coupled to the device that hosts processing system 100. These interfaces 122, 124, etc., can include can include a personal computer interface (PCI), personal computer memory card international association (PCMCIA) interface, universal serial bus (USB) interface an Ethernet interface, Firewire (IEEE 1394) interface, small computer system interface (SCSI), a wireless telephony transceiver, a Bluetooth transceiver, a network card, a wireless local area network transceiver such as a 802.11 compatible transceiver, or other interface, either wired or wireless. The interface module 120 sends the EPG configuration data 30 to the EPG server 25 associated with a video distribution network 15, sends EPG commands 22 to the EPG server 25 and receives EPG data 20.

In addition, the interface module 120 receives video signals from the video distribution network 15 as broadcast video signals, video on demand video signals, streaming video signals or digital video files for download. Video signals 110 can be analog or digital video signals in any of a number of video formats with or without an associated audio component. Such analog video signal can include formats such as National Television Systems Committee (NTSC), Phase Alternating Line (PAL) or Sequentiel Couleur Avec Memoire (SECAM). Such digital video formats can include formats such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV), Audio Video Interleave (AVI), high definition media interface (HDMI) or another digital video format, either standard or proprietary.

Figure 5:
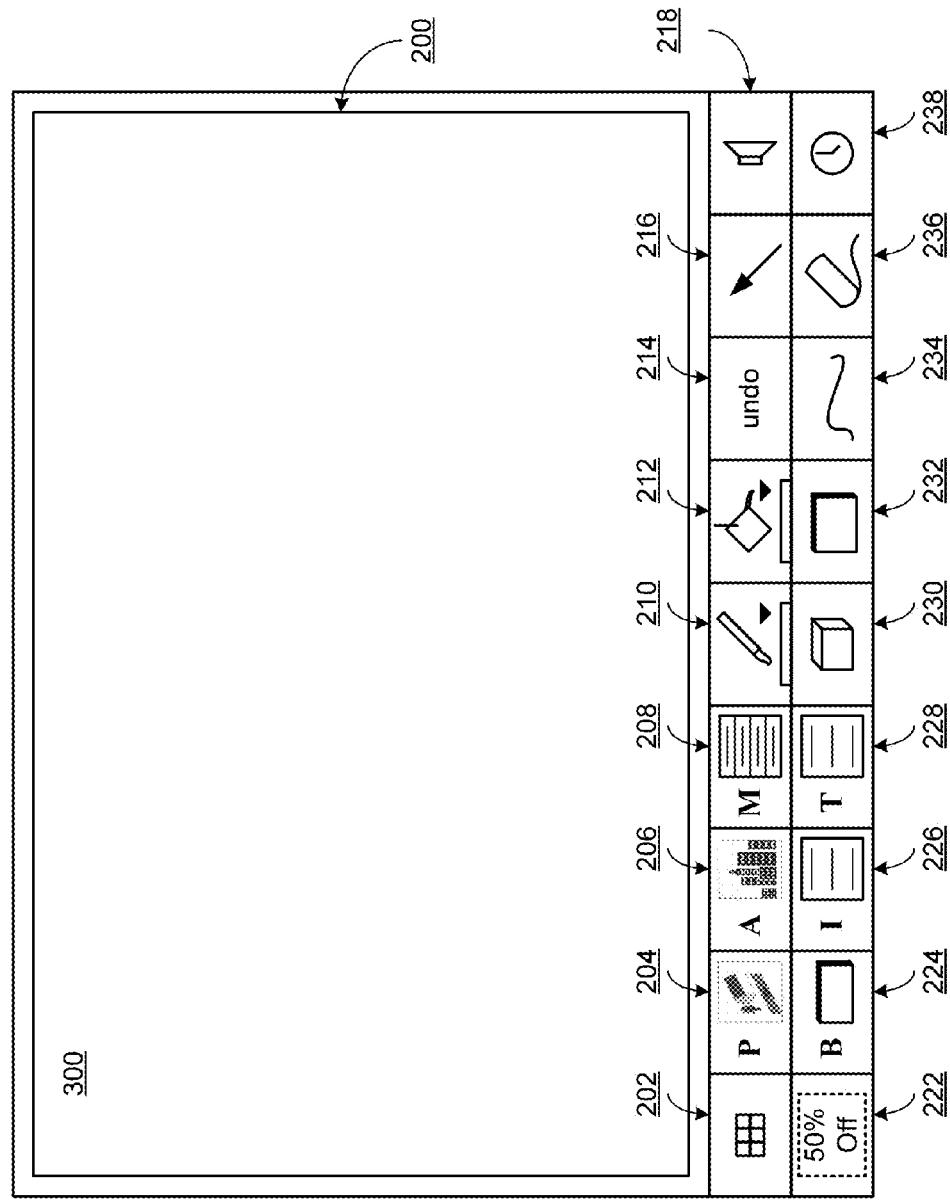
FIG. 5 presents a graphical representation of screen display 300 in accordance with an embodiment of the present invention.

FIG. 5 presents a graphical representation of screen display 300 in accordance with an embodiment of the present invention. In this particular example, screen display 300 is generated by the graphical user interface of the EPG authoring application 42 and displayed by a display device associated with client device 11-14 or 32 during the authoring of the EPG for a particular client device or group of client devices associated with a user. While not specifically shown, the EPG authoring application 42 can begin by allowing the user to specify a particular device having an associated display screen resolution and aspect ratio or by otherwise specifying the display screen resolution and aspect ratio for the device. In response, the EPG authoring application 42 displays a display window 200 having the appropriate aspect ratio to match the aspect ratio of the client device.

In addition, screen display 300 includes a tool bar having a plurality of user selectable buttons for implementing various functions of the EPG authoring application 42. In the embodiment shown the tool bar includes a grid tool 202 for creating, selecting and placing a grid of program schedule information or other program listings, a preview tool 204 for creating a preview pane with an image or video, an art tool 206 for inserting graphics, a menu tool 208 for setting up menus, a line tool 210 for drawing and coloring lines, a fill tool 212 for coloring regions, an undo tool 214 for reversing inserted items or recent changes, a selection tool 216 for setting up highlighting or cursor action to navigate between selectable areas, a sound tool 218 for establishing sounds for different interactions, an ad tool 222 for creating, selecting and placing advertising panes, a button tool 224 for inserting button selections, an info pane tool 226 for inserting an information pane, a text box tool 228 for inserting a text box, a 3D tool 230 for three-dimensionalizing boxes or other objects, a shadow tool 232 for shadowing boxes or other objects, a drawing tool 234 for drawing a free form line or curve, an eraser tool 236 for erasing all or part of a graphic and a clock insertion tool 238 for selecting and placing a clock panel. While particular tools are specifically shown, additional tools can be included, and a greater or fewer number of tools can be implemented.

In an embodiment of the present invention, screen display 300 includes a cursor or highlight function that allows the user of the client device 11-14 or 32 to select any of the buttons of the toolbar to use the associated tool to perform the underlying function and further to select, size, drag, place and drop objects on the screen display 300. In this fashion, the user can interact with the screen display 300 to choose the layout and content, and further the look and feel of the main screen, the menus and optionally other display screens of the EPG. FIGS. 6-9 present examples of such interactions.

Figure 6:
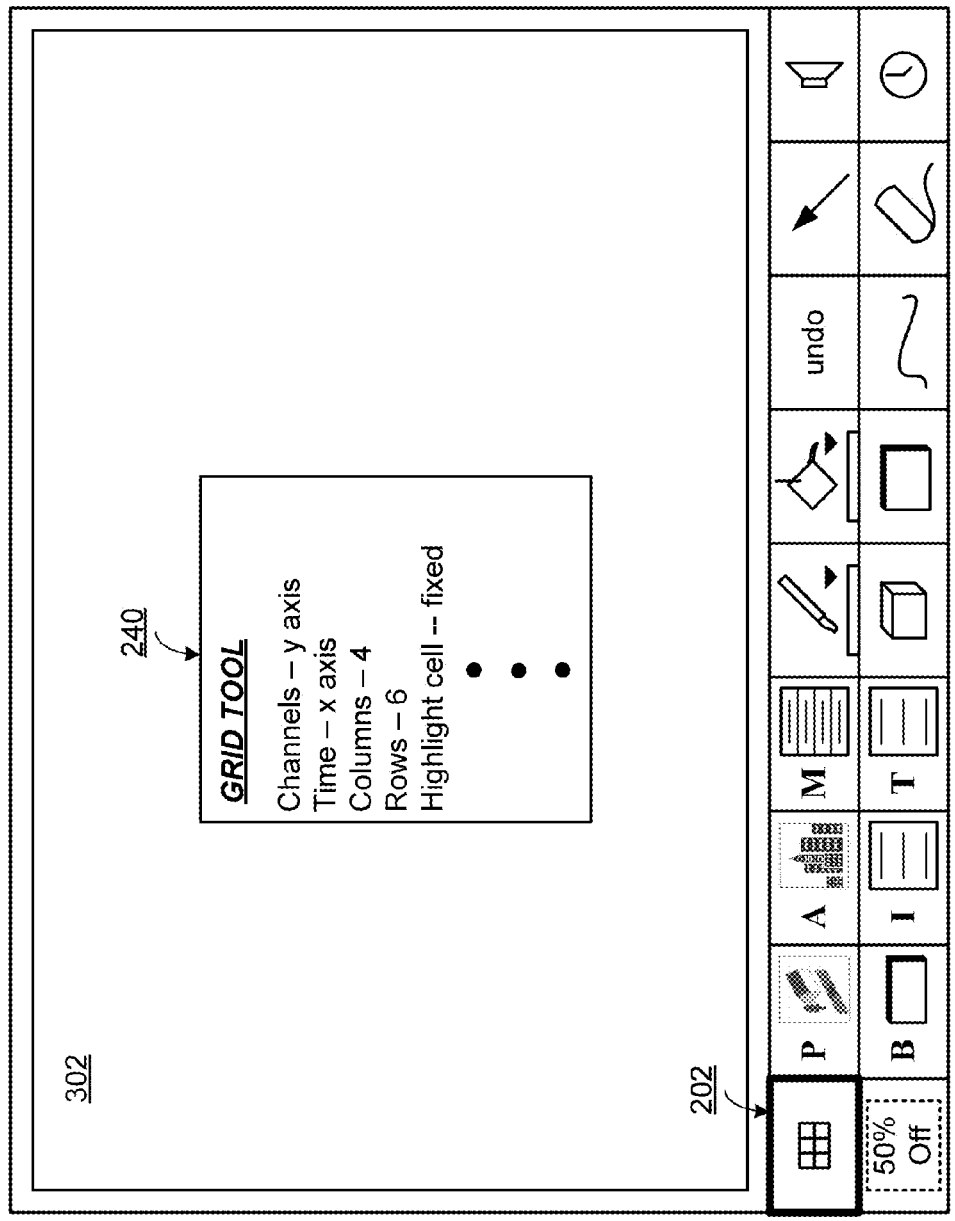
FIG. 6 presents a graphical representation of screen display 302 in accordance with an embodiment of the present invention.
Figure 7:
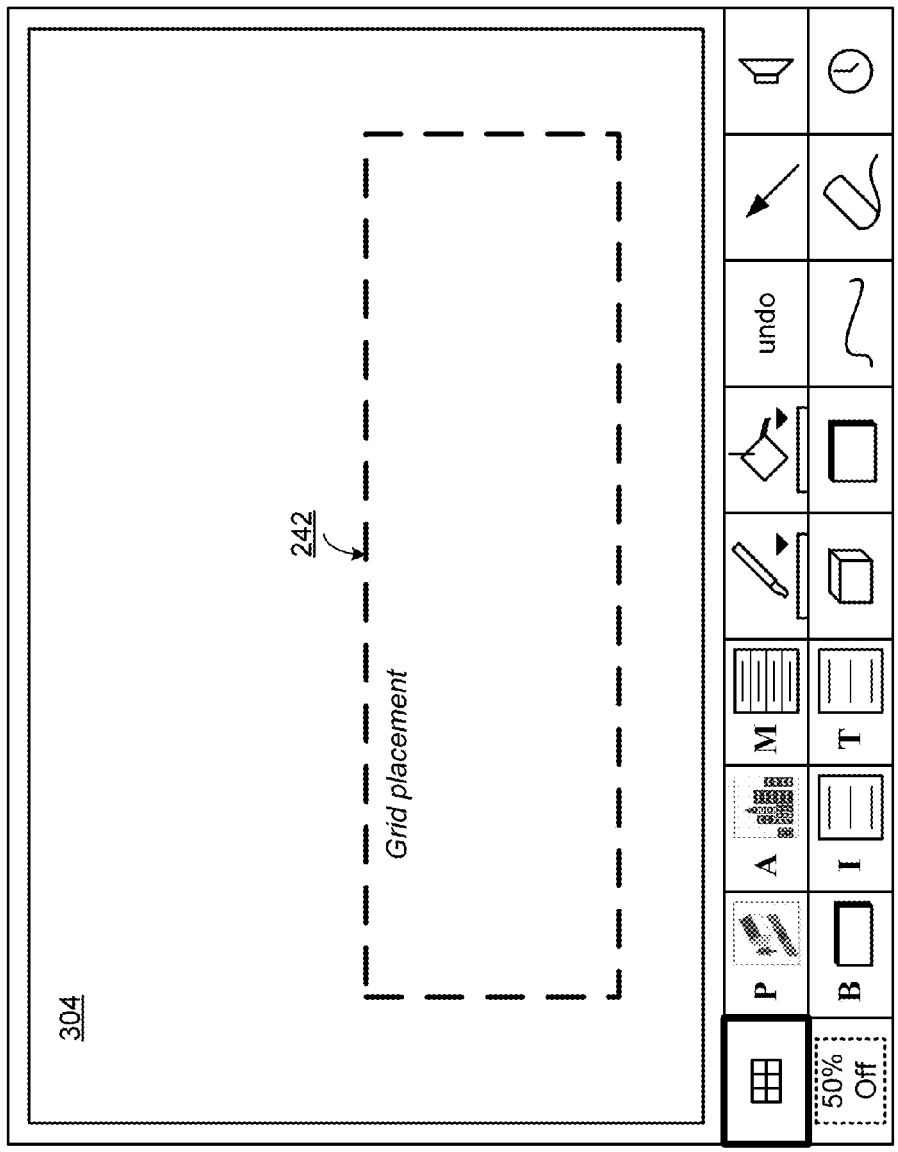
FIG. 7 presents a graphical representation of screen display 304 in accordance with an embodiment of the present invention.
Figure 8:
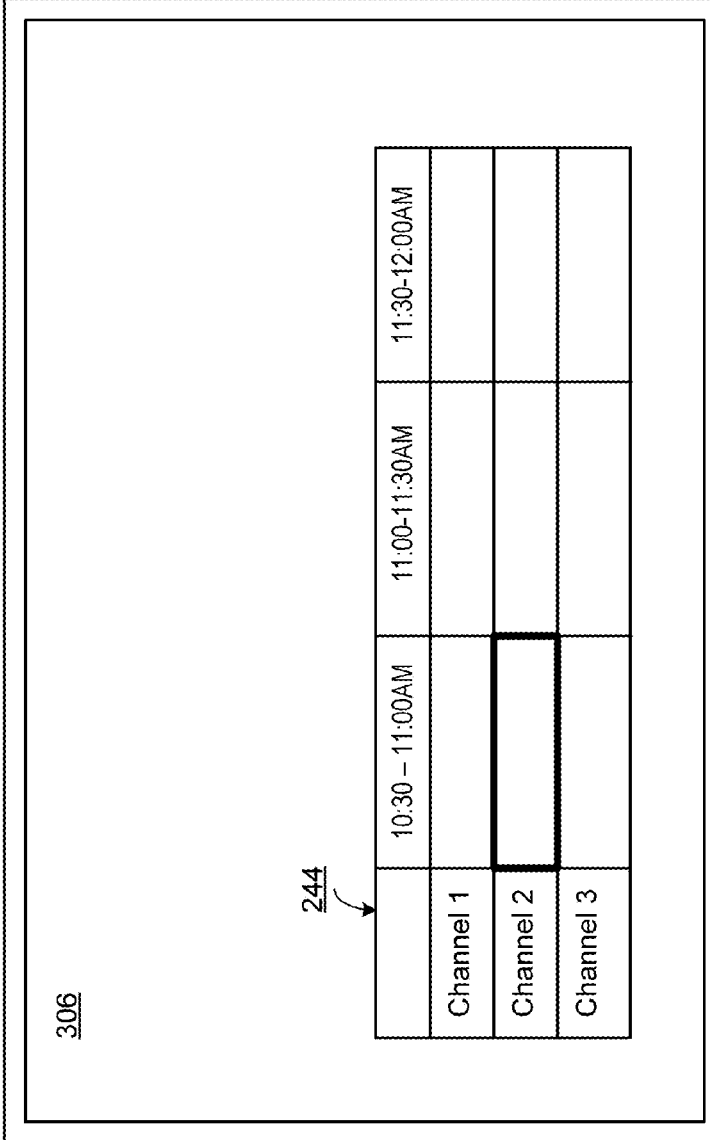
FIG. 8 presents a graphical representation of screen display 306 in accordance with an embodiment of the present invention.

FIGS. 6-8 present graphical representations of screen display 302, 304 and 306 in accordance with an embodiment of the present invention. In particular, FIGS. 6-8 present a sequence of displays that represent an example use of grid tool 202 to set up and place a program grid 244 on a main screen of the EPG that responds to EPG schedule data 34 of a broadcast network to display what is playing on selected channels at a range of times. In FIG. 6, the grid tool displays a menu 240 that allows the user to select individual grid parameters of the program grid. In FIG. 7, the user interacts with the graphical user interface to drag, drop and size a grid placement box 242 in order select the location and size of the program grid. In FIG. 8, a sample layout of the program grid 244 is displayed.

Figure 9:
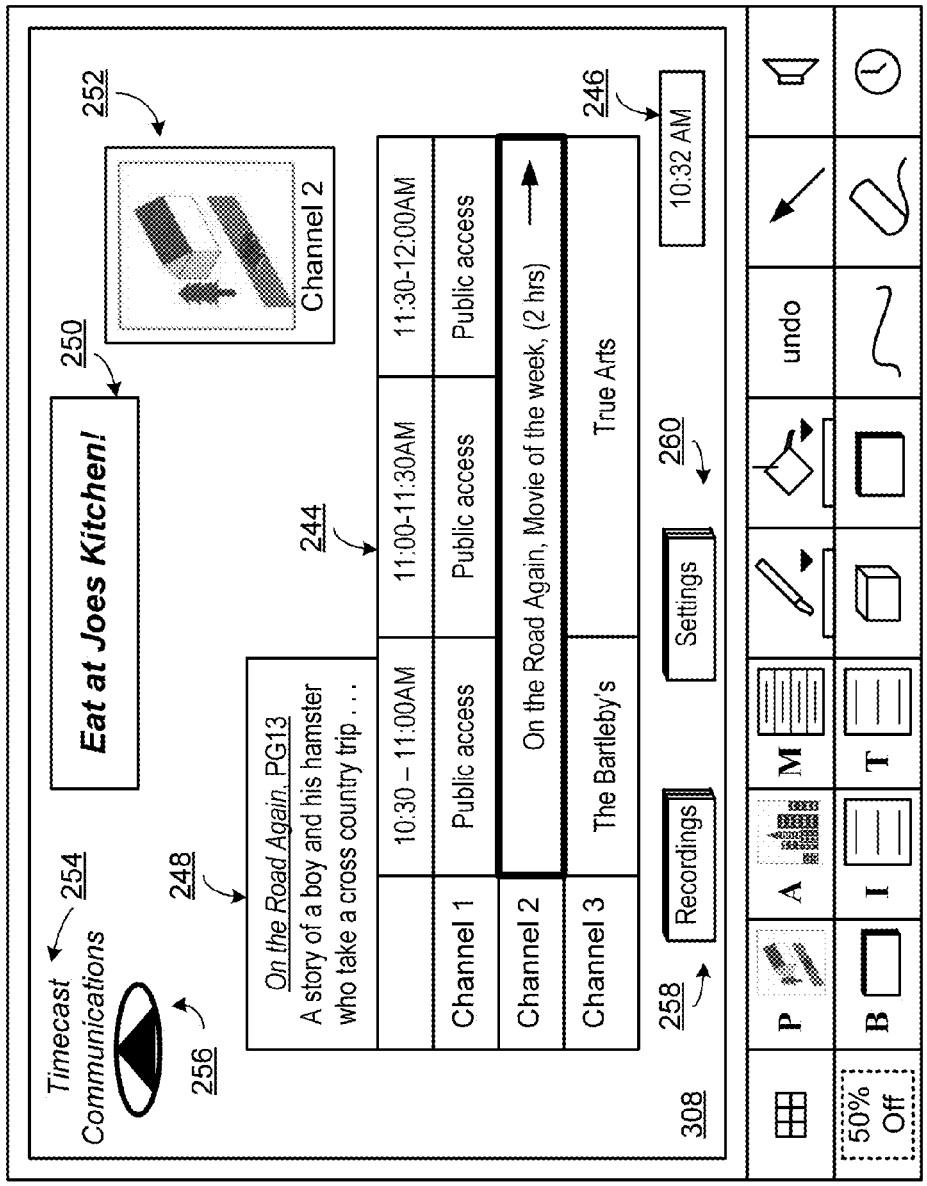
FIG. 9 presents a graphical representation of screen display 308 in accordance with an embodiment of the present invention.

FIG. 9 presents a graphical representation of screen display 308 in accordance with an embodiment of the present invention. In this particular example, a completed EPG screen is presented with ad pane 250 and clock feature 246 that displays the current time. The preview pane 252 previews the highlighted program in program grid 244 with either still images, a trailer of the program or other preview video included in EPG data 20. In the alternative, the EPG application 150 can include a transcoder that transcodes the video signal 110 corresponding to the channel currently highlighted in the program grid 244 and can display a transcoded, reduced resolution version of the video in the preview pane 252. The info pane 248 provides information on the highlighted program in program grid 244. Buttons 258 and 260 provide links to other screens that allow interaction with previous recordings and user settings. Text 254 and art 256 have been added to identify the content carrier.

While still in the EPG authoring application, the final EPG display screen can be previewed by the user in an emulation mode that mimics the functionality of the final EPG application as currently configured to determine its suitability, and to determine if any of the features need to be edited or changed. In particular, the tool bar is still presented in order to use any of the tools to add, delete or change features of one or more screens of the EPG that will be presented to the end user's client device.

Figure 10:
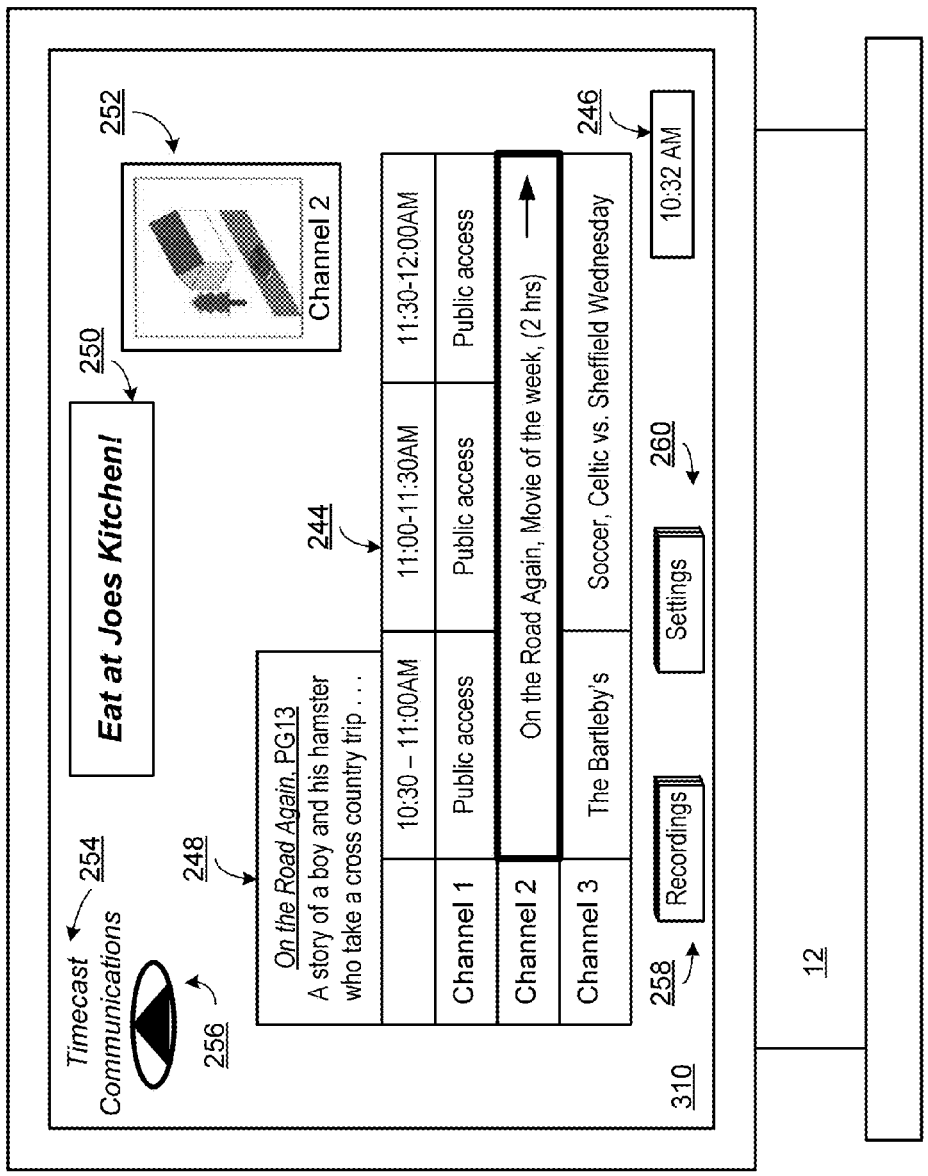
FIG. 10 presents a graphical representation of screen display 310 in accordance with an embodiment of the present invention.

FIG. 10 presents a graphical representation of screen display 310 in accordance with an embodiment of the present invention. In this example, the EPG application 150 television/monitor 12 presents a screen display 310 that is similar to the screen display 308 shown in the emulation mode of FIG. 9. The user of television 12 can navigate the program grid 244 to preview the current channel in preview pane 252, review information regarding a highlighted program in information pane 248, respond to advertisements presented in advertising pane 250, view programs recorded in an integrated or adjunct DVR or other storage device via button 258, and/or review or change settings via button 260. As shown, the tool bars presented at the bottom of display screens 300, 302, 304, 306, and 308 are omitted from the final EPG display screen.

As discussed in conjunction with FIG. 3, some or all of the images of the screen display 310 can be rendered by EPG server 25 as EPG images included in EPG data 20 sent to the television/monitor 12. As the user navigates the screen to move the cursor, select programs, etc., the user's interactions with the EPG application 150 generates EPG commands 22 sent to EPG server 25. In response to these commands, the EPG server renders new EPG images sent as EPG data 20 to the television/monitor 12 for display.

Figure 11:
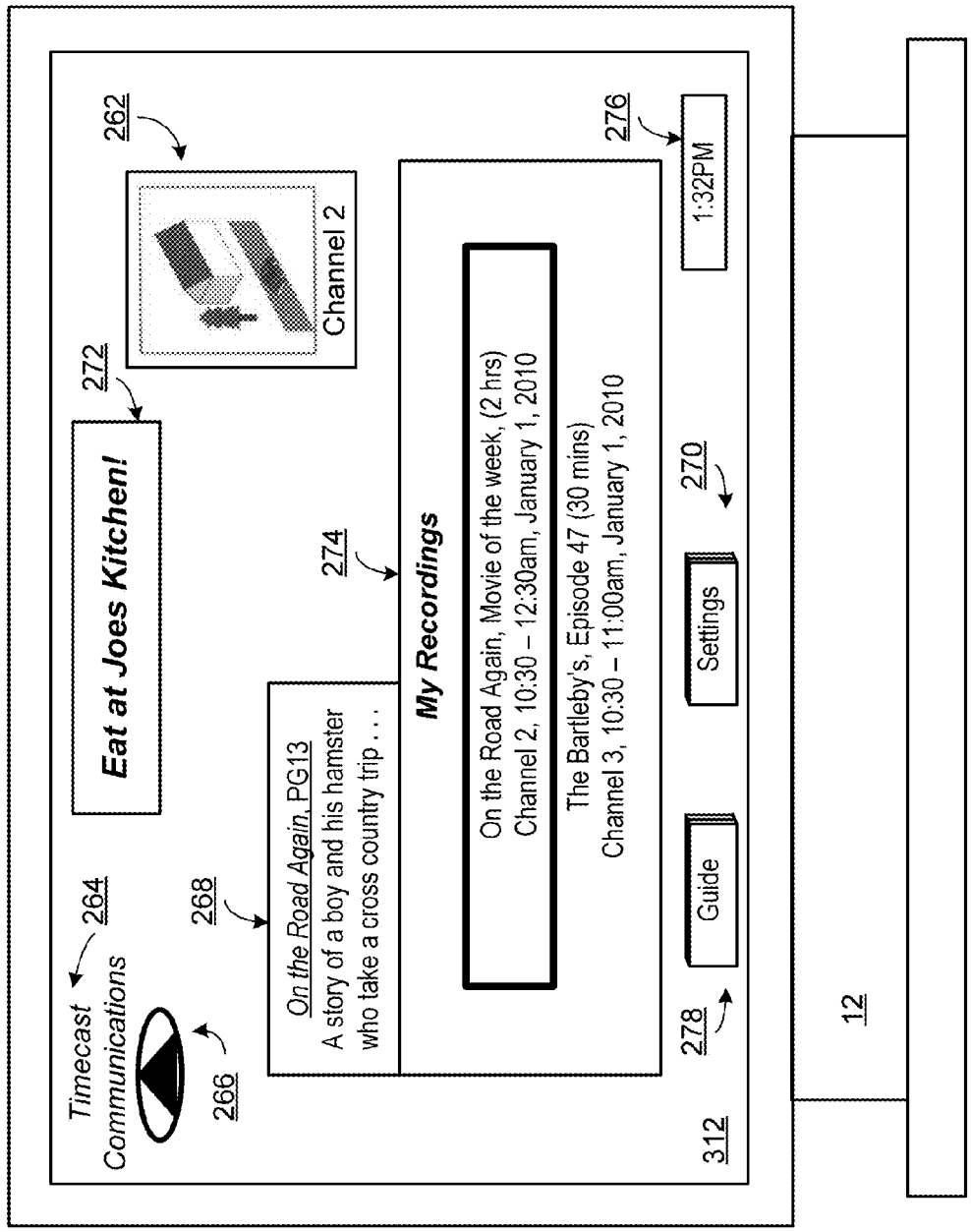
FIG. 11 presents a graphical representation of screen display 312 in accordance with an embodiment of the present invention.

FIG. 11 presents a graphical representation of screen display 312 in accordance with an embodiment of the present invention. In particular, screen display 312 presents a recording navigation screen of the EPG application 150 that allows a user to select, preview and play previous recordings. For example, in response to a selection of the recordings button 258, a new display screen is rendered by EPG server 25 and sent as EPG data 20 to the television/monitor 12 for display. This screen display 312 includes a selection pane 274 that allows a user to browse, highlight and select programs for viewing. The information pane 268 includes information on the highlighted recording. Preview pane 262 displays preview information for the highlighted recording, such as images, video clips, trailers or other video or image information pertaining to the highlighted recording. Settings button 260, text box 264, graphics 266 and advertising pane 272 perform similar functions to items 250, 254, 256 of screen display 310.

Figure 12:
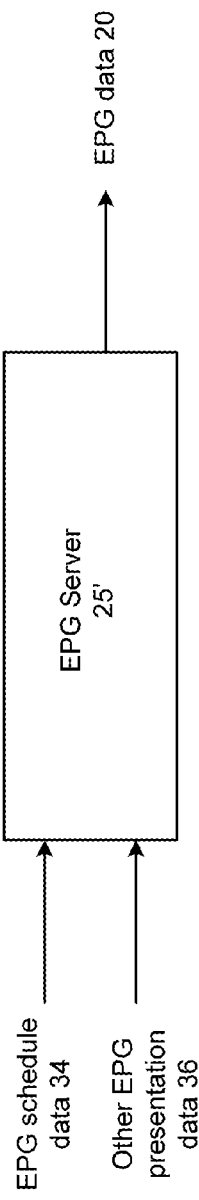
FIG. 12 presents a block diagram representation of an EPG server 25' in accordance with an embodiment of the present invention.

FIG. 12 presents a block diagram representation of an EPG server 25' in accordance with an embodiment of the present invention. In particular, EPG server 25' performs similar functions to EPG server 25. In this embodiment however, the rendering of the EPG images is performed by the client device that runs the EPG application, rather than by the EPG server 25'. The EPG server 25' receives and stores EPG schedule data 34 that includes program titles and optionally additional information such as Motion Picture Association of America ratings, program descriptions, program reviews and optionally other data that describes a plurality of video programs that are either available on a broadcast basis at particular times and on particular channels and/or other video programming that can be selected and streamed, downloaded or otherwise provided to the client device. In addition, the EPG server 25' optionally receives and buffers or stores other EPG presentation data such as live video feeds, such as channel feeds, program trailers, video commentary, supplemental program information, advertising data or other data to be provided in conjunction with the implementation of EPG application 150.

In this implementation, the EPG schedule data can be provided periodically as EPG data 20 for storage on the client device 11-14 and/or 32. In addition, the other EPG presentation data 36 can be provided on periodically or on demand as further EPG data 20 for storage on the client device 11-14 and/or 32.

Figure 13:
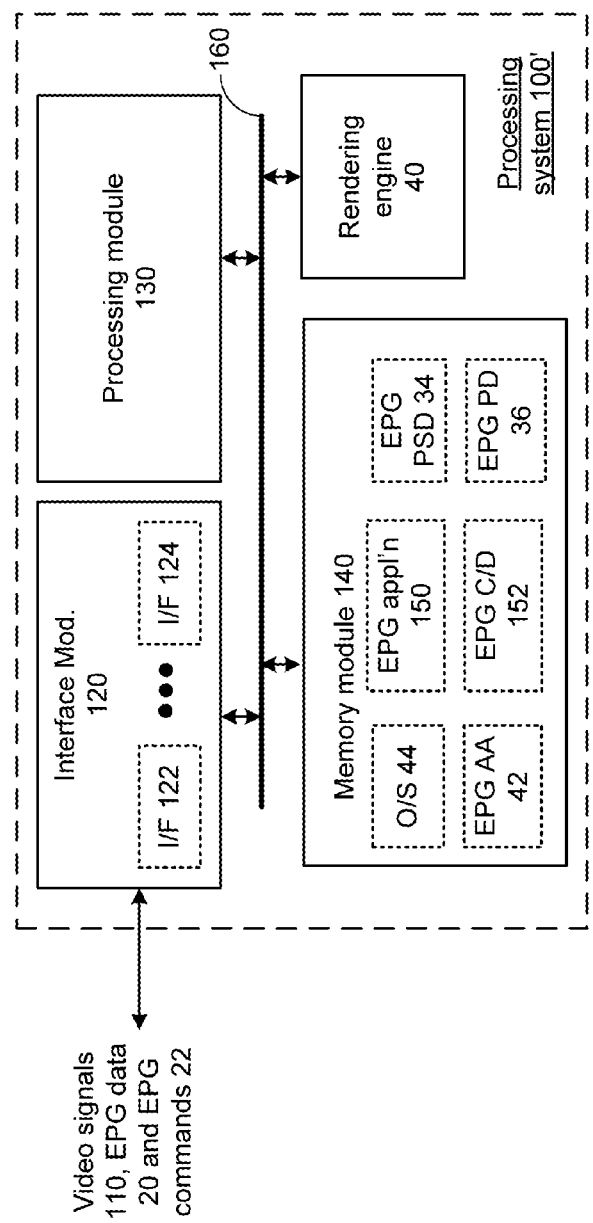
FIG. 13 presents a block diagram representation of a processing system 100' in accordance with an embodiment of the present invention.

FIG. 13 presents a block diagram representation of a processing system 100' in accordance with an embodiment of the present invention. In particular, processing system 100' is presented for use in any of the client devices 11-14 and/or 32 and in conjunction with EPG server 25'. Processing system 100' includes common elements to processing system 100 that are referred to by common reference numerals. In addition, processing system 100' includes rendering engine 40'. In this embodiment, the rendering of the EPG images is performed by rendering engine 40' of processing module 100'—in the client device that runs the EPG application 150, rather than by the EPG server 25'. Further, the memory module 140 stores both the EPG application 150 and the EPG configuration data 152.

In operation, the interface module 120 receives EPG data 20 from the video distribution network 15 that includes EPG schedule data 34 and optionally other EPG presentation data 36 for storage in memory module 140. In response to actions of the user, the processing module 130 selectively executes the EPG application 150. The EPG 150 generates the EPG commands in response to the end user's interaction that are implemented by the EPG application and the rendering engine 40'. The local rendering engine 40' generates EPG images based on the configuration data 152, the EPG commands and further based on EPG schedule data 34 and optionally other EPG presentation data 36.

Figure 14:
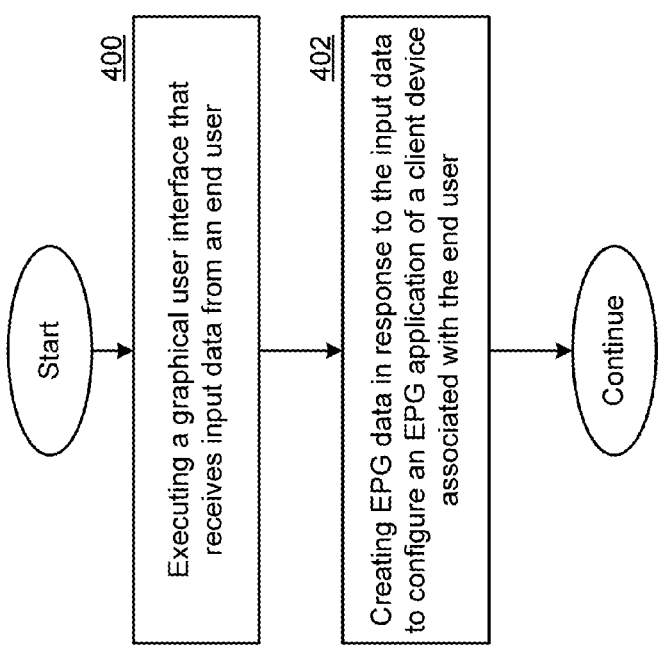
FIG. 14 presents a flowchart representation of a method in accordance with an embodiment of the present invention.

FIG. 14 presents a flowchart representation of a method in accordance with an embodiment of the present invention. In particular a method is presented for use in conjunction with one or more functions and features described in conjunction with FIGS. 1-13. In step 400, a graphical user interface is executed that receives input data from an end user. In step 402, EPG configuration data is created in response to the input data, to configure an EPG application of a client device associated with the end user.

In an embodiment of the present invention, the EPG configuration data includes a screen resolution of the client device.

Figure 15:
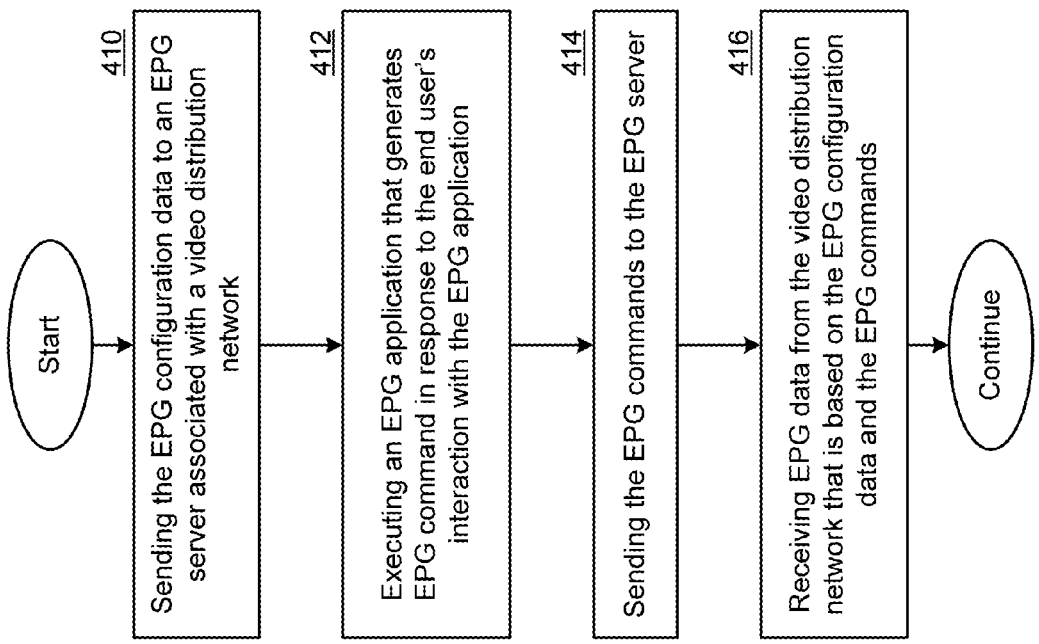
FIG. 15 presents a flowchart representation of a method in accordance with an embodiment of the present invention.

FIG. 15 presents a flowchart representation of a method in accordance with an embodiment of the present invention. In particular a method is presented for use in conjunction with one or more functions and features described in conjunction with FIGS. 1-14. In step 410, the EPG configuration data is sent to an EPG server associated with a video distribution network. In step 412, an EPG application is executed that generates EPG commands in response to the end user's interaction with the EPG application. In step 414, the EPG commands are sent to the EPG server. In step 416, EPG data is received from the video distribution network that is based on the EPG configuration data and the EPG commands.

In an embodiment of the present invention, the EPG data includes EPG images based on the configuration data, the EPG commands and further based on EPG schedule data.

FIG. 16 presents a flowchart representation of a method in accordance with an embodiment of the present invention. In particular a method is presented for use in conjunction with one or more functions and features described in conjunction with FIGS. 1-15. In step 420, a video preview pane is selected in response to the input data. In step 422, the video preview pane is placed on a display screen of the EPG application in response to the input data.

FIG. 17 presents a flowchart representation of a method in accordance with an embodiment of the present invention. In particular a method is presented for use in conjunction with one or more functions and features described in conjunction with FIGS. 1-16. In step 430, an advertising pane is selected in response to the input data. IN step 432, the advertising pane is placed on a display screen of the EPG application in response to the input data.

FIG. 18 presents a flowchart representation of a method in accordance with an embodiment of the present invention. In particular a method is presented for use in conjunction with one or more functions and features described in conjunction with FIGS. 1-17. In step 440, a program schedule grid on a display screen of the EPG application is configured in response to the input data.

FIG. 19 presents a flowchart representation of a method in accordance with an embodiment of the present invention. In particular a method is presented for use in conjunction with one or more functions and features described in conjunction with FIGS. 1-18. In step 450, EPG data is received from the video distribution network that includes EPG schedule data. In step 452, the EPG application is executed to generate EPG commands in response to the end user's interaction with the EPG application. In step 454, EPG images are generated, via a rendering engine of the client device, wherein the EPG images are based on the configuration data, the EPG commands and further based on the EPG schedule data.

While particular combinations of various functions and features of the present invention have been expressly described herein, other combinations of these features and functions are possible that are not limited by the particular examples disclosed herein are expressly incorporated within the scope of the present invention.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled".

As the term module is used in the description of the various embodiments of the present invention, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a processing system and video processing system along with a register arbitration module for use therewith and with other processing systems. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A processing system comprising:
a memory module that stores an electronic program guide (EPG) authoring application;
a processing module of a client device, coupled to the memory module, the processing module including at least one embedded processor that executes the EPG authoring application that includes a graphical user interface that responds to input from an end user and that creates EPG configuration data to configure an EPG application of the client device associated with the end user, wherein the EPG authoring application includes selection of a video preview pane and placement of the video preview pane on a display screen of the EPG application; and
an interface module, coupled to the processing module, that sends the EPG configuration data to an EPG server associated with a video distribution network, that sends EPG commands to the EPG server and that receives EPG data from the video distribution network that is based on the EPG configuration data and the EPG commands, and that receives at least one video signal from the video distribution network;
wherein the EPG server includes a rendering engine that generates EPG images based on the configuration data, the EPG commands and further based on EPG schedule data, wherein the EPG server includes a transcoder that transcodes a selected video signal to a reduced resolution for display in the video preview pane.

2. The processing system of claim 1 wherein the memory module further stores the EPG application and the processing module selectively executes the EPG application that generates the EPG commands in response to the end user's interaction with the EPG application.

3. The processing system of claim 1 wherein the EPG configuration data includes a screen resolution of the client device.

4. The processing system of claim 1 wherein the EPG authoring application includes selection of an advertising pane and placement of the advertising pane on a display screen of the EPG application.

5. The processing system of claim 1 wherein the EPG authoring application includes a grid tool for configuring a program schedule grid on a display screen of the EPG application.

6. The processing system of claim 1 wherein the EPG authoring application includes at least one of:
an art tool for inserting a graphical item on a display screen of the EPG application;
a line tool for adding lines on the display screen of the EPG application;
a fill tool for coloring regions on the display screen of the EPG application;
a sound tool for selecting sounds generated by the EPG application;
a text tool for adding text to the display screen of the EPG application; and
a clock insertion to for selecting and placing a clock icon on the display screen of the EPG application.

7. A method for use in an electronic program guide (EPG) authoring application comprising:
executing a graphical user interface that receives input data from an end user; and
creating EPG configuration data, in response to the input data, to configure an EPG application of a client device associated with the end user by:

sending the EPG configuration data to an EPG server associated with a video distribution network wherein the EPG configuration data indicates selection of a video preview pane and placement of the video preview pane on a display screen of the EPG application;

executing an EPG application that generates EPG commands in response to the end user's interaction with the EPG application;

sending the EPG commands to the EPG server; and receiving EPG data from the video distribution network includes EPG images that are rendered by the EPG server based on the EPG configuration data and the EPG commands wherein the EPG server includes a transcoder that transcodes a selected video signal to a reduced resolution for display in the video preview pane.

8. The method of claim 7 wherein the EPG configuration data includes a screen resolution of the client device.

9. The method of claim 7 further comprising:

selecting an advertising pane in response to the input data; and placing the advertising pane on a display screen of the EPG application in response to the input data.

10. The method of claim 7 further comprising:

configuring a program schedule grid on a display screen of the EPG application in response to the input data.

* * * * *